Jan. 4, 1938. H. C. BOWEN 2,104,220
HYDRAULIC BRAKE SYSTEM
Filed Feb. 4, 1935 2 Sheets-Sheet 2
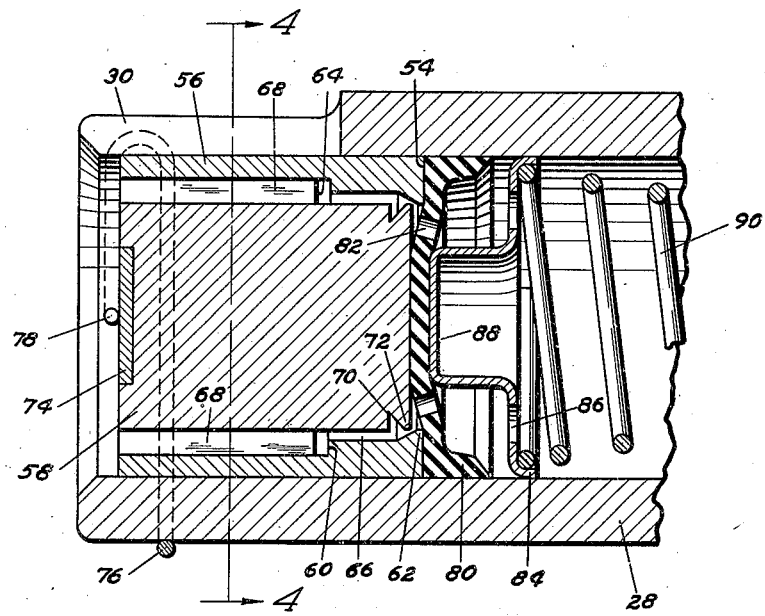
Fig. 3.
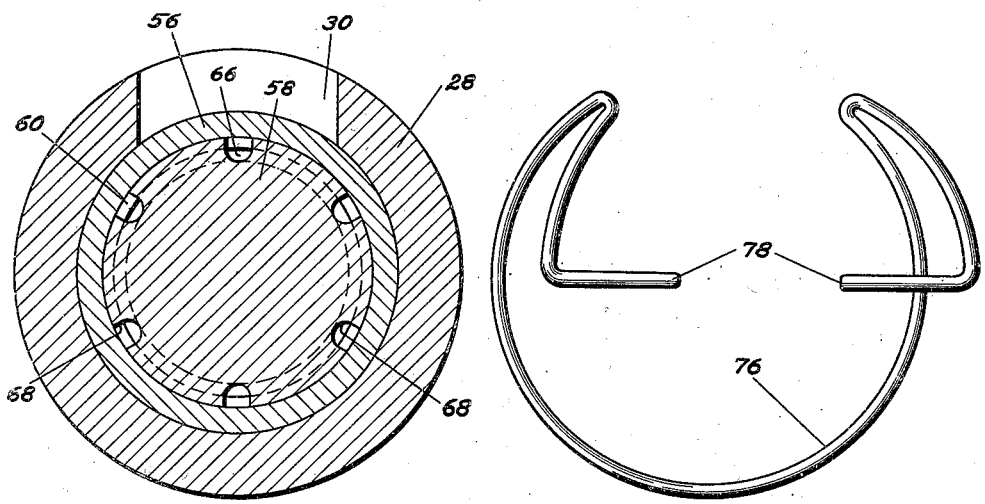
Fig. 4.
Fig. 5.
INVENTOR
HERBERT C. BOWEN
BY
Williams, Bradbury, McCaleb & Hinkle
ATTORNEYS Patented Jan. 4, 1938

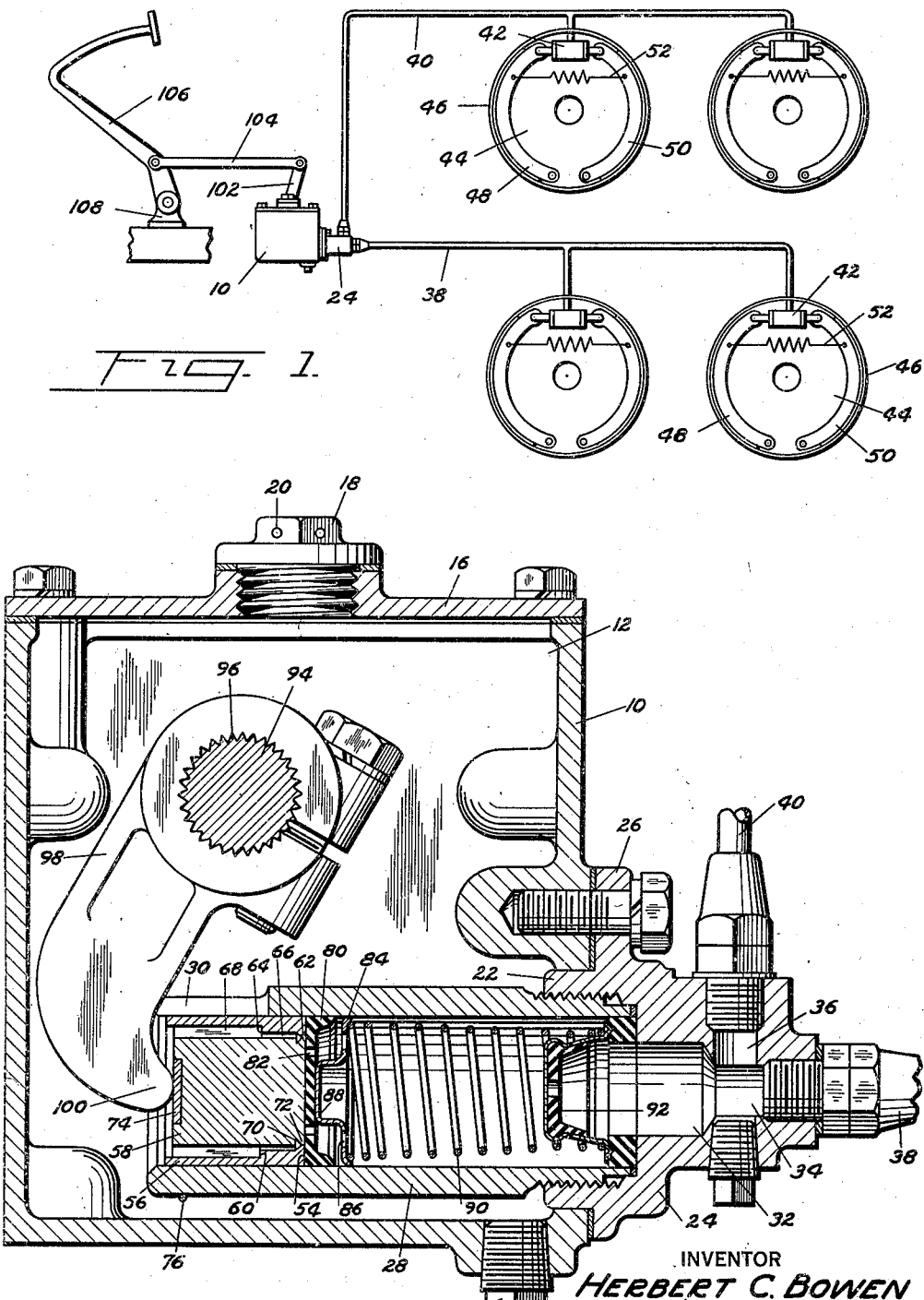

2,104,220

UNITED STATES PATENT OFFICE 2,104,220

HYDRAULIC BRAKE SYSTEM

Herbert C. Bowen, Detroit, Mich., assignor to Hydraulic Brake Company, Detroit, Mich., a corporation of California Application February 4, 1935, Serial No. 4,790

8 Claims. (Cl. 60—54.6)

This invention relates to hydraulic brake systems for motor vehicles.

An object of the invention is to provide a hydraulic brake system including a fluid compressor operable to maintain the system completely filled with fluid.

Another object of the invention is to provide a compressor for a hydraulic brake system including a cylinder and a piston reciprocable in the cylinder, the piston being operable to place fluid under pressure and upon release of the pressure on the fluid to by-pass the fluid in both directions so that the system may be maintained completely filled with fluid.

A feature of the invention is a piston including a shell, a plunger movable in the shell, and passages through the piston controlled by the plunger.

Another feature of the invention is a piston including relatively movable members controlling passages through the piston, a sealing cup on the head of the piston, and a spring imposing a load on one of the members through the axis of the cup so as to cause relative movement between the cup and the members and distortion of the cup to provide for free passage of fluid through the piston when the piston is on its retraction stroke and when in retracted position.

Other objects and features of the invention will more fully appear from the following description taken in connection with the drawings forming a part of this specification, and in which,—

Fig. 1 is a schematic view of a hydraulic brake system embodying the invention;

Fig. 2 is a vertical, sectional view of the compressor;

Fig. 3 is an enlarged sectional view of a portion of the cylinder and the piston of the compressor;

Fig. 4 is a sectional view substantially on line 4—4 Fig. 3; and

Fig. 5 is a detail view of the piston retaining means.

Referring to the drawings for more specific details of the invention, 10 represents a fluid compressor including a reservoir 12 having a drain plug 14 and a removable top 16 provided with a filling opening closed as by a conventional closure plug 18 provided with suitable vents 20.

The reservoir has an opening in its side adjacent its bottom for the reception of a relatively short sleeve 22 formed integral with a head 24 and provided with a radial flange 26 bolted or otherwise suitably secured to the wall of the reservoir. The sleeve supports a cylinder 28 within the reservoir in parallel relation to and relatively near the bottom thereof. As shown, one end of the cylinder is threaded in the sleeve, and its other end has a longitudinal slot 30 for the reception of an operating lever or arm.

The head 24 has a port 32 and passages 34 and 36 communicating with the port. Fluid pressure delivery pipes or conduits 38 and 40 connected respectively to the respective passages 34 and 36 are each connected to one pair of fluid pressure motors 42. One pair of fluid pressure motors is arranged for the actuation of the brakes associated with the front wheels of a motor vehicle, and the other pair is arranged for the actuation of the brakes associated with the rear wheels of the vehicle.

As shown, each of the brake structures includes a backing plate 44 associated with a rotatable drum 46. The backing plate has pivoted thereon corresponding friction elements 48 and 50 adaptable for cooperation with the drum, and one of the fluid pressure motors 42 is connected between the separable ends of the friction elements for spreading these ends into engagement with the drum against the resistance of retractile springs 52 connected between the friction elements.

A piston 54 reciprocable in the cylinder 28 includes a shell 56 and a relatively movable core or plunger 58. The shell has a double diametral bore providing an annular shoulder 60 and the outer end of the smaller bore is reduced in diameter to provide an annular lip 62. The core or plunger 58 has a portion of reduced diameter providing an annular shoulder 64 opposed to the annular shoulder 60. This reduced portion of the plunger provides in conjunction with the shell 58 an annular chamber or passage 66 having direct communication with a plurality of longitudinal grooves 68 in the periphery of the plunger and in direct communication with the reservoir 12. The reduced portion of the plunger also has a circumferential groove 70 providing an annular lip 72 for cooperation with the annular lip 62 on the shell, and the plunger has a case-hardened insert 74 for engagement with a force applying means to be hereinafter described.

Upon initial movement of the piston on its compression stroke, the plunger 58 is advanced in the shell to engage the annular shoulder 64 of the plunger with the annular shoulder 60 of the shell. When in this position the lip 62 on the shell registers with the lip 72 on the plunger, presenting substantially a solid face on the piston.

The piston, including the shell and the plunger, is retained in the cylinder by a spring clip 76 embracing the cylinder. This clip has diametrically disposed end portions 78 which extend through apertures in the wall of the cylinder into the path of the shell and the plunger.

A sealing cup 80 on the head of the piston is provided with a plurality of apertures 82 for the passage of fluid from the reservoir to that portion of the cylinder forward of the piston. The apertures 82 are arranged in spaced relation to one another and in a circle the center of which is in the axis of the cup. Seated on the cup is a disk 84 having a plurality of apertures 86 for the free passage of fluid and a concentric or set-off portion 88 centered on the cup. The cup and disk are held against displacement by a spring 90 interposed between the disk and a valve 92 controlling the port 32. This spring also serves to return the piston to its retracted position.

A shaft 94 extending through the reservoir 12 has a serrated portion 96 and a lever or arm 98 clamped to this serrated portion on the shaft has a lateral end 100 adaptable for engagement with the case-hardened insert 74 in the plunger 58. The shaft 94 also has suitably secured thereto an arm 102 connected as by a link 104 to a foot pedal lever 106 pivoted on a fixed support 108.

Under normal conditions, when the system is not in operation, the piston 54 is in retracted position wherein the shell 56 is seated on the stop 78 of the clip 76 and the plunger 58 in the shell is likewise in retracted position wherein it is also seated on the stop 78. When in retracted position as shown in Fig. 3, fluid may flow through the piston. This is due to the relative position of the shell and the plunger wherein the annular lip 72 on the plunger has moved from registering position with the annular lip 62 on the shell, resulting in opening the passages 66 and 68.

When the piston is in retracted position with its shell and plunger both seated on the stop 78, the sealing cup 80 on the head of the piston is distorted under the influence of the disk 84 and the spring 90. This distortion of the cup results in uncovering the openings 88 in the cup and thereby establishes communication between the reservoir 12 and that portion of the cylinder 28 forward of the head of the piston to the end that the cylinder may be completely filled with fluid.

Under these conditions, upon applying force to the foot pedal lever 106 the force is transmitted through the rod 104 and arm 102 to the shaft 94 to rock the shaft. This movement of the shaft moves the lever or arm 98 on the shaft through an angle and this movement of the arm 98 is transmitted to the piston to move the piston on its compression stroke. During the initial movement of the piston the plunger 58 advances in the shell 56 to engage the shoulder 64 on the plunger with the shoulder 60 of the shell. When these shoulders are in engagement the annular lip 62 on the shell registers with the annular lip 72 on the plunger, and the head of the piston and the head of the plunger are in the same plane and present substantially an uninterrupted face or seat for the leak-proof cup.

Under these conditions communication between the reservoir and the cylinder is cut off, and the shell and the plunger move as one unit. Upon further movement of the piston on its compression stroke, fluid is displaced from the cylinder past the valve 92 and through the ports 34 and 36 and conduits 38 and 40 to the fluid pressure motors 42, causing actuation of these motors with the resultant spreading of the friction elements 48 and 50 against the resistance of the retractile springs 52 into engagement with the drums 46.

After a braking operation, upon release of the applied force on the foot pedal lever, this lever is returned to its normal retracted position under the influence of a conventional retractile spring, not shown. Upon the return of the foot pedal lever to its normal or retracted position, the applied force on the piston is released, whereupon the spring 90 becomes effective to return the piston to its retracted position. The load on the spring 90 is transmitted through the disk 48 and the cup 80 to the plunger 58. This results in moving the plunger relative to the shell, thereby opening the passages 66 and 68 and causing distortion of the cup, resulting in uncovering the openings 82 and establishing communication between the reservoir and the cylinder.

As the piston returns to its retracted position fluid returns to the cylinder 10 from the fluid pressure actuated motors 42. This movement of the fluid is due to the pressure on the pistons of the motors 42 imposed between the retractile springs 52 connected between the friction elements 48 and 50.

Because of the load on the spring 90 and the friction on the fluid in the cylinder 28 and the conduits connecting this cylinder to the motor cylinders, the piston in the cylinder returns to its retracted position on the stop 78 slightly in advance of the return of the fluid to the cylinder. This causes a partial vacuum in the cylinder, resulting in admission of fluid from the reservoir through the piston into the cylinder. Upon complete return of the piston to its retracted position and the return of fluid from the motors 42, any excess fluid is returned through the piston to the reservoir.

The present invention is an improvement over the subject matters of my issued Patent Nos. 2,060,846 dated November 17, 1936 and 2,071,059 dated February 16, 1937.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim is new and desire to secure by Letters Patent is,—

1. In a fluid pressure system, a compressor including a cylinder and a piston reciprocable therein, said piston comprising relatively movable parts, a sealing cup on the piston distortable into fluid passing condition upon relative movement of the parts in one direction, mechanical means for relatively moving said piston parts to distort said cup to permit flow of fluid therepast, and means for effecting relative movement of the parts in the opposite direction.

2. In a fluid pressure system, a compressor including a cylinder and a piston reciprocable therein, said piston comprising relatively movable parts, a sealing cup on the piston distortable into fluid passing relation upon relative movement of the parts in one direction, a spring arranged to cause relative movement of the piston parts upon the retraction stroke of the piston and to distort said cup to render it fluid passing, and means for effecting relative movement of the parts in the opposite direction.

3. In a fluid pressure system, a compressor including a cylinder and a piston reciprocable therein, said piston comprising relatively movable parts and passages controlled by said parts, a sealing cup on the piston having openings therein adapted to be closed by a part of said piston during the compression stroke and being distortable into fluid passing relation upon relative movement of the parts in one direction, a return spring for the piston arranged to cause relative movement of the parts at the beginning of the return stroke of the piston and to thereby distort said cup to render it fluid passing, and means for effecting relative movement of the parts in the opposite direction, said piston passages being fluid passing when the cup is distorted.

4. In a fluid pressure system, a compressor including a cylinder having a port in its head, a valve controlling the port, a piston reciprocable in the cylinder, said piston comprising relatively movable parts and passages through the piston controlled by said parts, a sealing cup on the piston having openings therein, said openings being spaced from the periphery of said cup and being adapted to be closed by a part of the piston during the compression stroke and being distortable upon relative movement of the parts in one direction, a return spring for the piston between the cup and the valve arranged to cause said relative movement of the parts, and means for effecting opposite relative movement of said parts, said piston passages being fluid passing when the cup is distorted.

5. In a fluid pressure system, a compressor including a reservoir, a cylinder supplied therefrom having a port in its head, a valve controlling the port, a piston reciprocable in the cylinder, said piston comprising relatively movable parts adapted to permit fluid to pass therebetween, a sealing cup on the head of the piston having openings therein controlled by one of said parts and being distortable into fluid passing relation upon relative movement of the parts in one direction, said piston being fluid passing when the cup is distorted, a disc having a concentric portion seated on the cup in the path of one of the parts, a spring between the disc and the valve imposing a load through the cup on one of the parts causing said relative movement of the parts at the beginning of the return stroke of the piston, and means for effecting opposite relative movement of the parts at the beginning of the compression stroke.

6. In a fluid pressure system, a compressor including a reservoir, a cylinder supplied therefrom having a port in its head, a valve controlling the port, a piston reciprocable in the cylinder, said piston comprising relatively movable parts and passages through the piston, means for limiting relative movement of the parts, annular lips on the parts adapted to register on the compression stroke of the piston, a cup on the head of the piston having openings controlled by one of the parts, a disc having a concentric portion seated on the cup in the path of one of the parts, a spring interposed between the disc and the valve to render the cup and piston fluid passing, and means for compressing the spring.

7. A hydraulic brake system comprising a compressor including a cylinder and a piston movable in the cylinder, said piston comprising a shell, and a plunger movable in the shell, said shell and plunger providing passages through the piston, a sealing cup on the piston having openings controlled by the plunger, said openings being spaced from the periphery of said cup, and a spring imposing a load on the cup in the path of the plunger to render the cup and piston fluid passing.

8. A hydraulic brake system comprising a reservoir, a cylinder supplied therefrom having a port in its head, a valve controlling the port, a piston reciprocable in the cylinder, said piston including a shell having an annular lip, a plunger movable in the shell having passages therethrough to render the piston fluid passing and an annular lip adapted to register with the annular lip on the shell during the compression stroke of the piston, a sealing cup on the piston, said cup including a circular series of openings spaced from the periphery of the cup and controlled by relative movement of said plunger and shell, a spring interposed between the cup and the valve imposing a load on the plunger, an actuating member for moving said plunger into contact with the shell and for moving the piston during the compression stroke, a fluid actuated motor connected to the cylinder, a rotatable member, friction elements movable into engagement with the rotatable member by the motor and a spring for retracting the friction elements.

HERBERT C. BOWEN.